US010393404B2

(12) United States Patent
Kondo et al.

(10) Patent No.: US 10,393,404 B2
(45) Date of Patent: Aug. 27, 2019

(54) HEAT EXCHANGER AND HOT WATER APPARATUS

(71) Applicant: NORITZ CORPORATION, Hyogo (JP)

(72) Inventors: Masaki Kondo, Himeji (JP); Takeshi Oohigashi, Kakogawa (JP); Wataru Ooshita, Himeji (JP)

(73) Assignee: NORITZ CORPORATION, Hyogo (JP)

( * ) Notice: Subject to any disclaimer, the term of this patent is extended or adjusted under 35 U.S.C. 154(b) by 0 days.

(21) Appl. No.: 15/698,748

(22) Filed: Sep. 8, 2017

(65) Prior Publication Data

US 2018/0087806 A1 Mar. 29, 2018

(30) Foreign Application Priority Data

Sep. 26, 2016 (JP) .................................. 2016-187230

(51) Int. Cl.
*F24H 9/06* (2006.01)
*F24H 1/12* (2006.01)
(Continued)

(52) U.S. Cl.
CPC ............... *F24H 1/124* (2013.01); *F24H 1/40* (2013.01); *F24H 1/445* (2013.01); *F24H 8/00* (2013.01); *F24H 9/1809* (2013.01); *F24H 9/1836* (2013.01); *F28D 7/0075* (2013.01); *F28D 7/1623* (2013.01); *F28D 9/0031* (2013.01); *F28D 9/0037* (2013.01); *F28D 9/0043* (2013.01); *F28D 9/0093* (2013.01);
(Continued)

(58) Field of Classification Search
CPC .......... F24H 1/08; F24H 2210/00; F24H 9/06; F24H 9/14; F24H 9/148; F24H 1/43; F24H 8/006; F24H 9/0031; F24H 1/124; F24H 9/0037; F28D 9/005; F24F 1/24
See application file for complete search history.

(56) References Cited

U.S. PATENT DOCUMENTS 4,807,588 A * 2/1989 Bentley .................... F24H 3/105
126/110 R
9,702,589 B2 * 7/2017 Kim ......................... F23L 15/00
(Continued)

FOREIGN PATENT DOCUMENTS

JP         08200981 A  *  8/1996
JP         5043859 B2     10/2012
KR  10-2016-0083840 A  †  7/2016

*Primary Examiner* — Gregory A Wilson
(74) *Attorney, Agent, or Firm* — Studebaker & Brackett PC

(57) ABSTRACT

A latent heat recovery heat exchanger includes a case, a heat exchange portion, and a straightening vane. The heat exchange portion includes a plurality of heat transfer plates surrounded by a peripheral wall portion of the case and layered on one another, each of the plurality of heat transfer plates extending in a direction from an inlet toward an outlet. The straightening vane includes a top plate portion covering the plurality of heat transfer plates so as to close a space between the plurality of heat transfer plates in end portions of the plurality of heat transfer plates in a direction intersecting with a direction of layering of the plurality of heat transfer plates when the heat exchange portion is viewed from the inlet toward the outlet.

10 Claims, 10 Drawing Sheets

(51) Int. Cl.

| | |
|---|---|
| *F28D 9/00* | (2006.01) |
| *F24H 1/40* | (2006.01) |
| *F24H 1/44* | (2006.01) |
| *F24H 8/00* | (2006.01) |
| *F24H 9/18* | (2006.01) |
| *F28F 9/00* | (2006.01) |
| *F28F 9/26* | (2006.01) |
| *F28D 7/00* | (2006.01) |
| *F28D 7/16* | (2006.01) |
| *F28D 21/00* | (2006.01) |

(52) U.S. Cl.
CPC .......... *F28D 21/0007* (2013.01); *F28F 9/001* (2013.01); *F28F 9/26* (2013.01); *F28F 2230/00* (2013.01); *Y02B 30/102* (2013.01)

(56) References Cited

U.S. PATENT DOCUMENTS

| | | | |
|---|---|---|---|
| 9,829,204 B2* | 11/2017 | Oohigashi | ................ F24H 8/00 |
| 9,829,257 B2* | 11/2017 | Oohigashi | ............ F24H 9/0031 |
| 2009/0133861 A1 | 5/2009 | Kim | |
| 2011/0174891 A1* | 7/2011 | Kowald | ................... F23L 1/00 |
| | | | 237/53 |
| 2016/0116228 A1* | 4/2016 | Huang | ............... F28D 21/0007 |
| | | | 122/18.2 |
| 2016/0341424 A1* | 11/2016 | Kashihara | ............... F23N 5/245 |
| 2017/0059205 A1* | 3/2017 | Kim | ....................... F28F 3/046 |
| 2017/0343213 A1* | 11/2017 | Ono | .................... F23M 20/005 |

\* cited by examiner
† cited by third party

HEAT EXCHANGER AND HOT WATER APPARATUS

BACKGROUND OF THE INVENTION

Field of the Invention

The present invention relates to a heat exchanger and a hot water apparatus.

Description of the Background Art

Some hot water apparatuses include a heat exchanger for exchanging heat between a heating gas and water and/or hot water. This heat exchanger is disclosed, for example, in Japanese Patent No. 5043859. In the heat exchanger in the publication, a plurality of unit heat exchangers are layered. In each unit heat exchanger, a plurality of heat transfer plates are layered. A projecting and recessed shape for increasing an area of heat transfer is formed in each central portion of the plurality of heat transfer plates. Outer peripheral portions of the plurality of heat transfer plates are joined to one another. Heat is exchanged between a heating gas which passes between two adjacent unit heat exchangers and water and/or hot water which flows in each unit heat exchanger.

In the heat exchanger in the publication, each central portion of the plurality of heat transfer plates contributes to heat exchange as the heating gas passes the projecting and recessed shape. Since each outer peripheral portion of the plurality of heat transfer plates does not have a projecting and recessed shape, it does not contribute to heat exchange even though a heating gas passes each outer peripheral portion. Therefore, thermal efficiency of the heat exchanger is lowered when the heating gas flows in each outer peripheral portion of the plurality of heat transfer plates.

SUMMARY OF THE INVENTION

The present invention was made in view of the problem above, and an object thereof is to provide a heat exchanger capable of achieving improved thermal efficiency and a hot water apparatus including the same.

A heat exchanger according to the present invention is configured to exchange heat between a heating gas which flows outside and water and/or hot water which flows inside. The heat exchanger includes a case, a heat exchange portion, and a straightening vane. The case includes an inlet where the heating gas flows in, an outlet where the heating gas flows out, and a peripheral wall portion which connects the inlet and the outlet to each other. The heat exchange portion includes a plurality of heat transfer plates surrounded by the peripheral wall portion of the case and layered on one another, each of the plurality of heat transfer plates extending in a direction from the inlet toward the outlet. The straightening vane is surrounded by the peripheral wall portion of the case and rectifies the heating gas. The straightening vane includes a top plate portion which covers the plurality of heat transfer plates so as to close a space between the plurality of heat transfer plates in end portions of the plurality of heat transfer plates in a direction intersecting with a direction of layering of the plurality of heat transfer plates when the heat exchange portion is viewed from the inlet toward the outlet.

According to the heat exchanger in the present invention, the top plate portion of the straightening vane covers the heat transfer plates so as to close the space between the plurality of heat transfer plates in the end portions of the plurality of heat transfer plates. Therefore, flow of the heating gas in the end portions of the plurality of heat transfer plates which does not contribute to heat exchange can be suppressed. Thermal efficiency of the heat exchanger can thus be improved.

In the heat exchanger, an outermost heat transfer plate of the plurality of heat transfer plates includes at least any of an inflow portion through which the water and/or hot water flows in and an outflow portion through which the water and/or hot water flows out. The top plate portion extends from the end portions of the plurality of heat transfer plates to an inner side relative to at least any of the inflow portion and the outflow portion in the direction intersecting with the direction of layering of the plurality of heat transfer plates when the heat exchange portion is viewed from the inlet toward the outlet. Therefore, the top plate portion can cover the plurality of heat transfer plates from the end portions of the plurality of heat transfer plates to the inner side relative to at least any of the inflow portion and the outflow portion. Therefore, flow of the heating gas in the end portions of the plurality of heat transfer plates which does not contribute to heat exchange can be suppressed. Thermal efficiency of the heat exchanger can thus be improved.

In the heat exchanger, the top plate portion includes a first top plate portion and a second top plate portion separate from the first top plate portion. The first top plate portion extends from the end portions of the plurality of heat transfer plates to the inner side relative to the inflow portion in the direction intersecting with the direction of layering of the plurality of heat transfer plates when the heat exchange portion is viewed from the inlet toward the outlet. The second top plate portion extends from the end portions of the plurality of heat transfer plates to the inner side relative to the outflow portion in the direction intersecting with the direction of layering of the plurality of heat transfer plates when the heat exchange portion is viewed from the inlet toward the outlet. Therefore, the first top plate portion can cover the plurality of heat transfer plates from the end portions of the plurality of heat transfer plates to the inner side relative to the inflow portion and the second top plate portion can cover the plurality of heat transfer plates from the end portions of the plurality of heat transfer plates to the inner side relative to the outflow portion. Therefore, flow of the heating gas in the end portions of the plurality of heat transfer plates which does not contribute to heat exchange can be suppressed. Thermal efficiency of the heat exchanger can thus be improved.

In the heat exchanger, the straightening vane includes a side plate portion which is connected to the top plate portion and extends in the direction from the inlet toward the outlet. The side plate portion covers the plurality of heat transfer plates so as to close a space between the plurality of heat transfer plates in the direction intersecting with the direction of layering of the plurality of heat transfer plates when the heat exchange portion is viewed from the inlet toward the outlet. Therefore, flow of the heating gas from the space between the plurality of heat transfer plates toward the case can be suppressed. Increase in temperature of the case can thus be suppressed.

In the heat exchanger, the side plate portion is fixed to each of the plurality of heat transfer plates. Therefore, the side plate portion can reinforce the plurality of heat transfer plates.

In the heat exchanger, the straightening vane includes a bottom plate portion connected to the side plate portion. The bottom plate portion covers the plurality of heat transfer plates so as to close a space between the plurality of heat transfer plates in the end portions of the plurality of heat transfer plates in the direction intersecting with the direction of layering of the plurality of heat transfer plates when the heat exchange portion is viewed from the outlet toward the inlet. Therefore, the heating gas can flow in the inside of the heat exchanger along the bottom plate portion. Increase in temperature of the case can thus be suppressed.

In the heat exchanger, the heat exchange portion includes a rear plate portion sandwiching the plurality of heat transfer plates between the rear plate portion and the peripheral wall portion in the direction of layering of the plurality of heat transfer plates and a protrusion portion protruding from the rear plate portion in the direction of layering of the plurality of heat transfer plates. The side plate portion lies between the plurality of heat transfer plates and the protrusion portion. Therefore, the side plate portion can be held as being sandwiched between the plurality of heat transfer plates and the protrusion portion. The side plate portion is thus readily held.

In the heat exchanger, each of the plurality of heat transfer plates includes a recess provided in an outer edge. The straightening vane has an end on a side of the heat exchange portion locked to the recess. Therefore, the straightening vane can be fixed to the plurality of heat transfer plates.

In the heat exchanger, the top plate portion is inclined to have a down grade inward from the end portions of the plurality of heat transfer plates. Therefore, the top plate portion can allow the heating gas to flow toward the inside of the heat exchanger. Thus, flow of the heating gas in the end portions of the plurality of heat transfer plates which does not contribute to heat exchange can be suppressed. Thermal efficiency of the heat exchanger can thus be improved.

A hot water apparatus according to the present invention includes the heat exchanger and a burner for generating the heating gas. Therefore, a hot water apparatus including the heat exchanger capable of achieving improved thermal efficiency can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described below with reference to the drawings.

A construction of a hot water apparatus in one embodiment of the present invention will initially be described.

Figure 1:
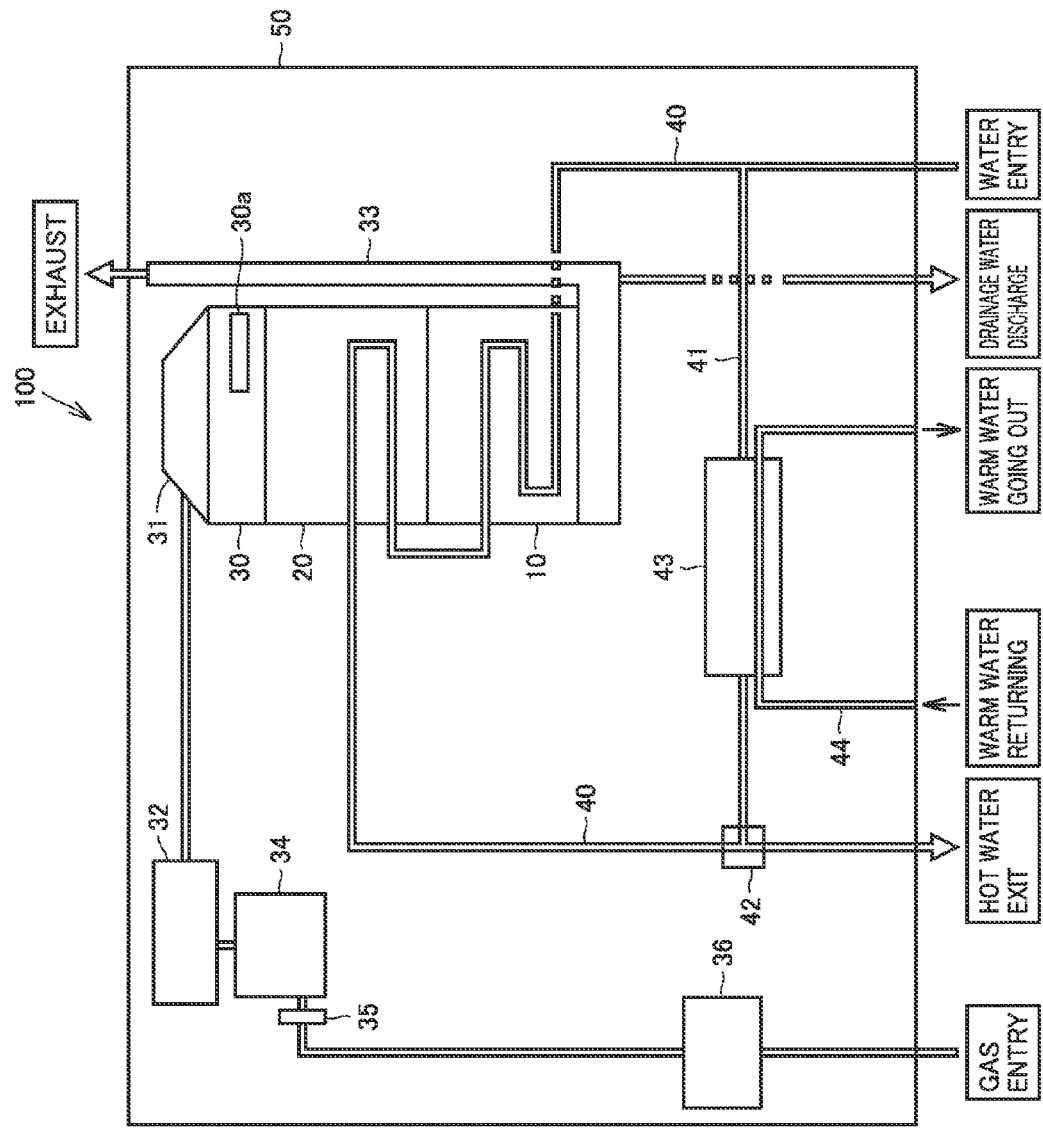
FIG. 1 is a diagram schematically showing a construction of a hot water apparatus in one embodiment of the present invention.

Referring to FIG. 1, a hot water apparatus 100 in the present embodiment mainly includes a latent heat recovery heat exchanger (secondary heat exchanger) 10, a sensible heat recovery heat exchanger (primary heat exchanger) 20, a combustion apparatus (burner) 30, a chamber 31, a fan assembly 32, a duct 33, a venturi 34, an orifice 35, a gas valve 36, a pipe 40, a bypass pipe 41, a three-way valve 42, a liquid to liquid heat exchanger 43, a hydronic pipe 44, and a housing 50. All of components except for housing 50 among the components above are accommodated in housing 50.

Fan assembly 32 is configured to send a mixture gas of a fuel gas and air taken in from the outside of housing 50 to combustion apparatus 30. Fan assembly 32 includes a fan case, an impeller arranged in the fan case, and a drive source (such as a motor) for rotating the impeller.

The fuel gas flows to venturi 34 through gas valve 36 and orifice 35. Gas valve 36 is configured to control a flow rate of the fuel gas. Air taken in from the outside of housing 50 flows to venturi 34.

The fuel gas and air are mixed in venturi 34. Venturi 34 is configured to increase a flow velocity of the mixture gas by reducing the flow of the mixture gas of the fuel gas and air. The mixture gas which has passed through venturi 34 is sent by fan assembly 32 to combustion apparatus 30 through chamber 31.

Combustion apparatus (burner) 30 is configured to generate a heating gas (combustion gas). Combustion apparatus 30 is configured to supply the combustion gas to sensible heat recovery heat exchanger 20 and latent heat recovery heat exchanger 10. Combustion apparatus 30 is an inverse combustion type apparatus which supplies a combustion gas downward. The mixture gas issued from combustion apparatus 30 is ignited by an igniter 30a and becomes the combustion gas.

The combustion gas sequentially passes through sensible heat recovery heat exchanger 20 and latent heat recovery heat exchanger 10. Thereafter, the combustion gas is discharged to the outside of housing 50 through duct 33. Therefore, the combustion gas flows downward from above through the inside of sensible heat recovery heat exchanger 20 and latent heat recovery heat exchanger 10, changes its direction in duct 33, and flows upward from below.

Each of sensible heat recovery heat exchanger 20 and latent heat recovery heat exchanger 10 is configured to exchange heat with the combustion gas supplied by combustion apparatus 30. Sensible heat recovery heat exchanger 20 is attached under combustion apparatus 30 and latent heat recovery heat exchanger 10 is attached under sensible heat recovery heat exchanger 20.

Sensible heat recovery heat exchanger 20 is a heat exchanger for recovering sensible heat of the combustion gas. Sensible heat recovery heat exchanger 20 recovers sensible heat of the heating gas (combustion gas) generated by combustion apparatus 30. Latent heat recovery heat exchanger 10 is a heat exchanger for recovering latent heat of the combustion gas. Latent heat recovery heat exchanger 10 recovers latent heat of the heating gas (combustion gas). Water vapor of the combustion gas is condensed in latent heat recovery heat exchanger 10 and condensed water (drainage water) is produced. Drainage water is drained to the outside of housing 50 through a part of duct 33.

When a temperature of incoming water and/or hot water is low also in sensible heat recovery heat exchanger 20 or when an amount of heating by combustion apparatus 30 is small, drainage water is produced also in sensible heat recovery heat exchanger 20. Drainage water is drained to the outside of housing 50 through a part of duct 33 via latent heat recovery heat exchanger 10.

Sensible heat recovery heat exchanger 20 and latent heat recovery heat exchanger 10 are connected to each other through pipe 40. A part of pipe 40 on a water entry side relative to latent heat recovery heat exchanger 10 and a part of pipe 40 on a hot water exit side relative to sensible heat recovery heat exchanger 20 are bypassed by bypass pipe 41.

The part of pipe 40 on the hot water exit side relative to sensible heat recovery heat exchanger 20 and bypass pipe 41 are connected to each other by three-way valve 42. Three-way valve 42 is constructed to be able to switch between a flow path from sensible heat recovery heat exchanger 20 to a hot water outlet of pipe 40 and a flow path from sensible heat recovery heat exchanger 20 to bypass pipe 41.

Liquid to liquid heat exchanger 43 is connected to bypass pipe 41. Hydronic pipe 44 connected to a hydronic terminal is inserted in liquid to liquid heat exchanger 43. Warm water warmed as a result of passage through sensible heat recovery heat exchanger 20 and latent heat recovery heat exchanger 10 flows in liquid to liquid heat exchanger 43. As warm water which flows in liquid to liquid heat exchanger 43 flows outside hydronic pipe 44, heat can be exchanged between warm water which flows in liquid to liquid heat exchanger 43 and warm water which flows in hydronic pipe 44.

Water supplied to hot water apparatus 100 becomes hot as a result of heat exchange with the combustion gas in sensible heat recovery heat exchanger 20 and latent heat recovery heat exchanger 10. Hot water can thus be supplied by hot water apparatus 100.

Warm water which returns from the hydronic terminal passes through hydronic pipe 44 to be warmed as a result of heat exchange with warm water warmed by sensible heat recovery heat exchanger 20 and latent heat recovery heat exchanger 10 in liquid to liquid heat exchanger 43 and thereafter it is supplied again to the hydronic terminal. Warm water can thus be supplied to the hydronic terminal by hot water apparatus 100.

A plate type heat exchanger in the present embodiment is applied to latent heat recovery heat exchanger 10 of hot water apparatus 100.

A construction of a heat exchanger set in the present embodiment will now be described with reference to FIGS. 2 and 3. The heat exchanger set includes latent heat recovery heat exchanger 10, sensible heat recovery heat exchanger 20, and sealing member 60. Sensible heat recovery heat exchanger 20 is arranged on latent heat recovery heat exchanger 10 with sealing member 60 being interposed. Sealing member 60 lies between latent heat recovery heat exchanger 10 and sensible heat recovery heat exchanger 20. Sealing member 60 is in a surrounding shape. Sealing member 60 is in a form of a flat plate.

Sensible heat recovery heat exchanger (primary heat exchanger) 20 mainly includes a case 21, a header 22, and a heat transfer tube 23. Case 21 includes a first sidewall 21a to a fourth sidewall 21d. First sidewall 21a to fourth sidewall 21d are connected in the order of first sidewall 21a to fourth sidewall 21d. Case 21 forms a frame which opens upward and downward as being defined by first sidewall 21a to fourth sidewall 21d. A combustion gas is fed through the upper opening and the combustion gas is exhausted through the lower opening.

Header 22 is provided on an outer surface of first sidewall 21a. A pipe joint 24a on the water entry side and a pipe joint 24b on the hot water exit side are attached to header 22 provided on the outer surface of first sidewall 21a. Not-shown header 22 is provided also on an outer surface of third sidewall 21c.

Header 22 provided on the outer surface of first sidewall 21a and header 22 provided on the outer surface of third sidewall 21c are connected to each other through a plurality of heat transfer tubes 23.

Water and/or hot water introduced from pipe joint 24a on the water entry side flows out of pipe joint 24b on the hot water exit side through header 22 provided on the outer surface of first sidewall 21a, heat transfer tubes 23, and header 22 provided on the outer surface of third sidewall 21c.

The heating gas exchanges heat with water and/or hot water which flows in the plurality of heat transfer tubes 23 of sensible heat recovery heat exchanger 20, and thereafter passes through the lower opening in case 21 and flows into latent heat recovery heat exchanger 10.

Figure 3:
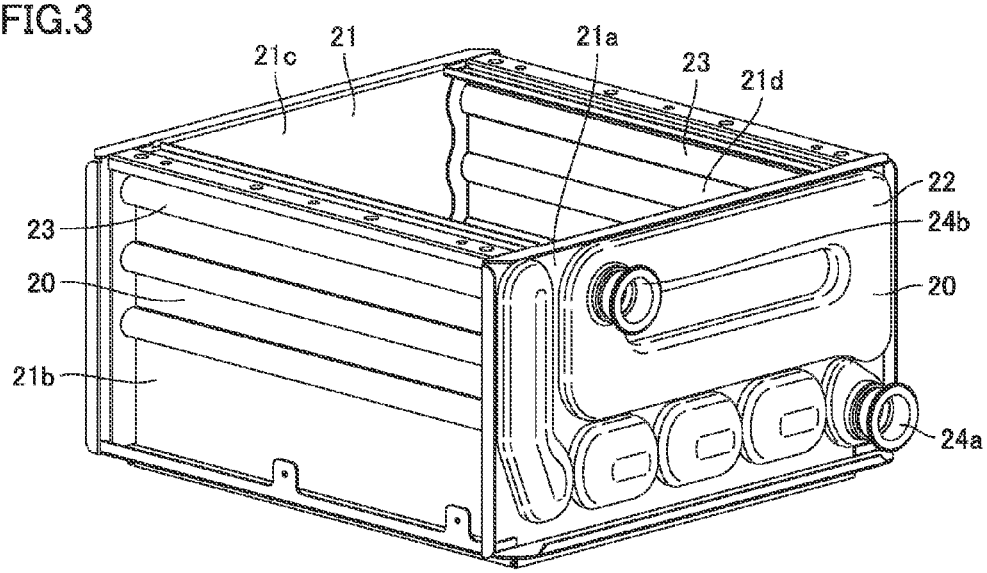
FIG. 3 is an exploded perspective view schematically showing the construction of the sensible heat recovery heat exchanger and the latent heat recovery heat exchanger in one embodiment of the present invention.
Figure 3:
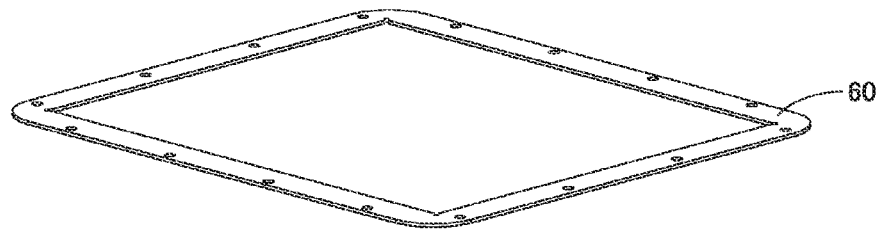
Figure 3:
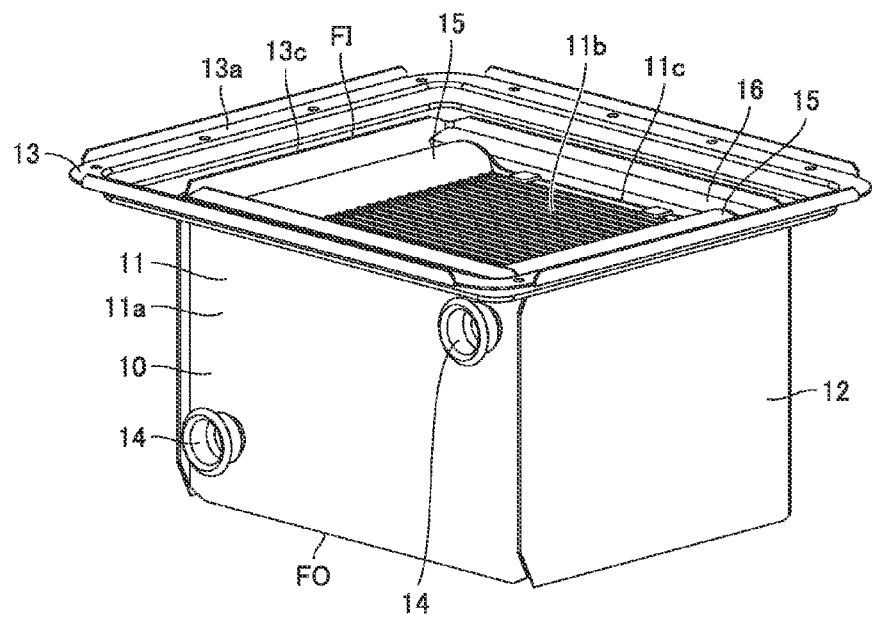
Figure 4:
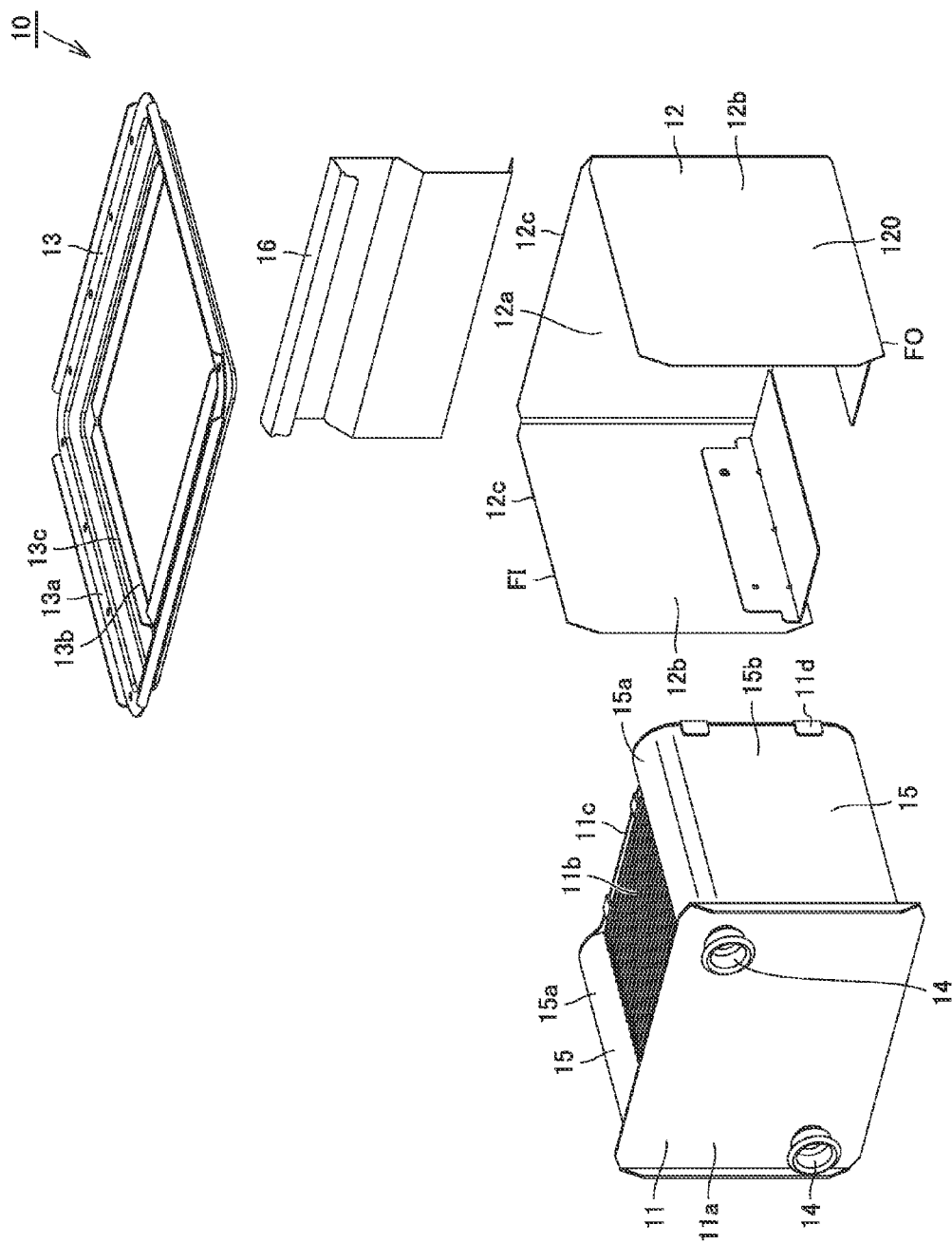
FIG. 4 is an exploded perspective view schematically showing the construction of the latent heat recovery heat exchanger in one embodiment of the present invention.

Referring to FIGS. 3 and 4, latent heat recovery heat exchanger 10 mainly includes a heat exchange portion 11, a case 12, a flange member 13, a pipe joint portion 14, a straightening vane 15, and a straightening member 16. Latent heat recovery heat exchanger 10 is configured to exchange heat between a heating gas which flows outside and water and/or hot water which flows inside.

Figure 5:
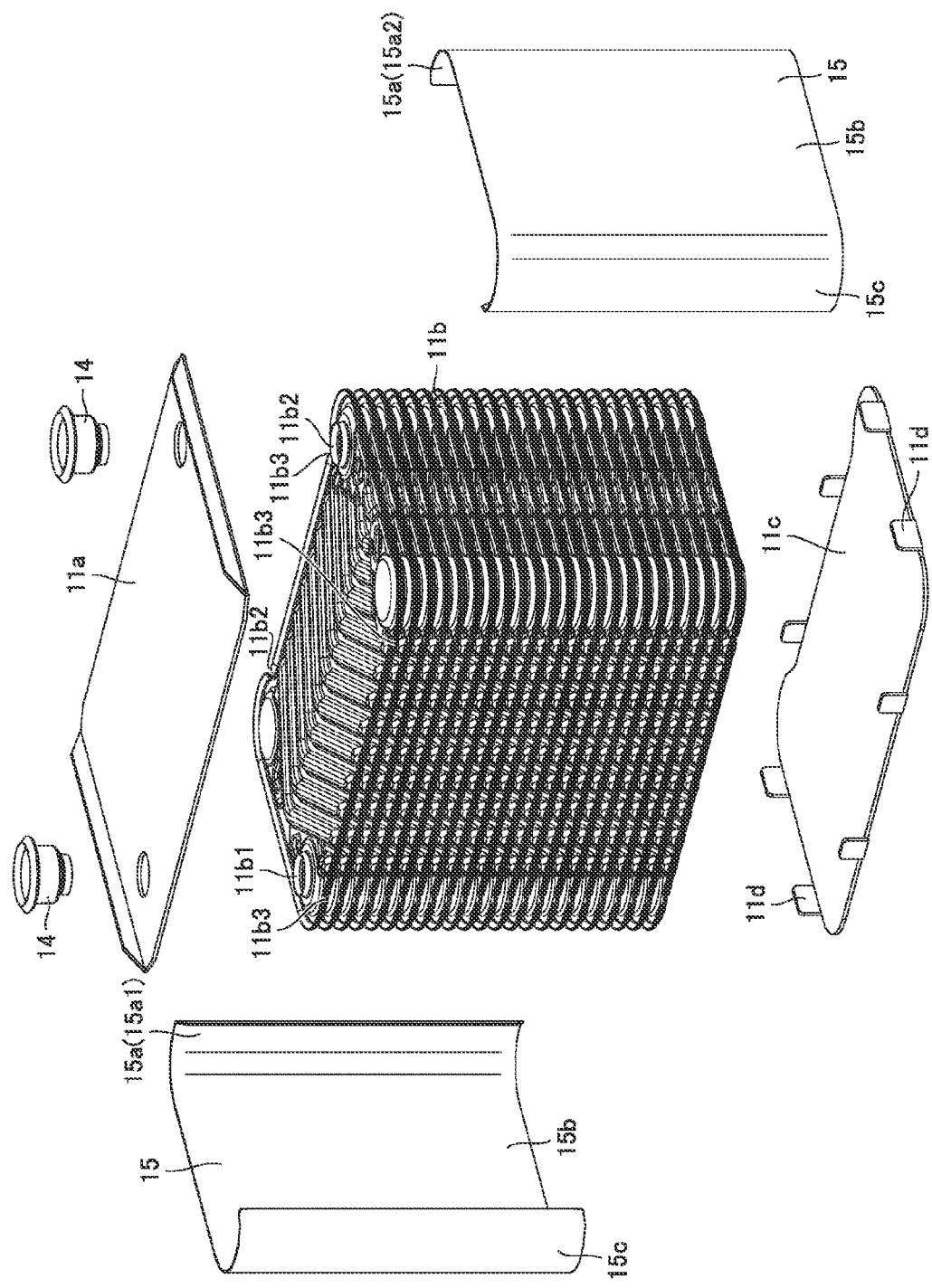
FIG. 5 is an exploded perspective view schematically showing a construction of a heat exchange portion of the latent heat recovery heat exchanger in one embodiment of the present invention.

Referring to FIGS. 4 and 5, heat exchange portion 11 includes a front plate portion 11a, a plurality of heat transfer plates 11b, a rear plate portion 11c, and a protrusion portion 11d. Front plate portion 11a and rear plate portion 11c are arranged to sandwich the plurality of heat transfer plates 11b therebetween.

Front plate portion 11a is provided as an outermost layer of heat exchange portion 11. Front plate portion 11a is brazed to a front surface of heat transfer plate 11b arranged in the forefront among the plurality of heat transfer plates 11b.

Rear plate portion 11c is provided as an outermost layer of heat exchange portion 11 on a side opposite to front plate portion 11a with respect to the plurality of heat transfer plates 11b. Rear plate portion 11c is brazed to a rear surface of heat transfer plate 11b arranged rearmost among the plurality of heat transfer plates 11b. Protrusion portion 11d protrudes from rear plate portion 11c in the direction of layering of the plurality of heat transfer plates 11b.

The plurality of heat transfer plates 11b are layered on one another. The plurality of heat transfer plates 11b are arranged as being superimposed on one another in a direction in which front plate portion 11a and rear plate portion 11c are opposed to each other.

Front plate portion 11a is joined to heat transfer plate 11b arranged at one end (a first end) in the direction of layering of the plurality of heat transfer plates 11b and rear plate portion 11c is joined to heat transfer plate 11b arranged at the other end (a second end) in the direction of layering of the plurality of heat transfer plates 11b.

Adjacent heat transfer plates 11b of the plurality of heat transfer plates 11b are brazed to each other. A gap between a pair of adjacent heat transfer plates 11b of the plurality of heat transfer plates 11b defines a flow path through which water and/or hot water passes.

A space between the pairs of adjacent heat transfer plates 11b of the plurality of heat transfer plates 11b defines a flow path through which a combustion gas flows. Each of a space between a pair of heat transfer plates 11b and front plate portion 11a and a space between a pair of heat transfer plates 11b and rear plate portion 11c also defines a flow path through which a combustion gas passes. Heat can thus be exchanged between water and/or hot water which passes through latent heat recovery heat exchanger (secondary heat exchanger) 10 and a combustion gas.

Heat transfer plate 11b has, for example, a substantially rectangular outer geometry in a plan view. Heat transfer plate 11b is formed, for example, by pressing one flat plate. Heat transfer plate 11b has flow path projections and recesses formed in pressing. The flow path projections and recesses of heat transfer plate 11b have a plurality of flow path projections and a plurality of flow path recesses. As the plurality of heat transfer plates 11b are layered on one another, the plurality of flow path projections and the plurality of flow path recesses define flow paths for passage of water and/or hot water between a pair of heat transfer plates 11b, and a space between the pair of heat transfer plates 11b defines a flow path for passage of a combustion gas.

A pair of pipe joint portions 14 is attached to front plate portion 11a. Pipe joint portion 14 is configured to allow water and/or hot water to flow in and out of the plurality of heat transfer plates 11b. Outermost heat transfer plate 11b of the plurality of heat transfer plates 11b has at least any of an inflow portion 11b1 through which water and/or hot water flows in and an outflow portion 11b2 through which water and/or hot water flows out. In the present embodiment, outermost heat transfer plate 11b includes both of inflow portion 11b1 and outflow portion 11b2.

Outermost heat transfer plate 11b is connected to pipe joint portion 14 on the water entry side at inflow portion 11b1 with front plate portion 11a being interposed and connected to pipe joint portion 14 on the hot water exit side at outflow portion 11b2. Each of the pair of pipe joint portions 14 is a pipe joint for connecting a pipe. A flow path in each of the pair of pipe joint portions 14 is connected to an internal flow path of each of the plurality of heat transfer plates 11b.

A pipe connected to one of the pair of pipe joint portions 14 is a pipe for allowing water and/or hot water to flow into an internal flow path in each of a pair of heat transfer plates 11b. A pipe connected to the other of the pair of pipe joint portions 14 is a pipe for allowing water and/or hot water to flow out of the internal flow path in each of the pair of heat transfer plates 11b.

A through hole is provided in each of the plurality of heat transfer plates 11b. Each through hole communicates with an internal flow path in the pair of heat transfer plates 11b. The through hole is arranged directly under pipe joint portion 14. The through hole communicates with a flow path in pipe joint portion 14. Therefore, water and/or hot water introduced from pipe joint portion 14 on the water entry side flows through the internal flow path in each of the pair of heat transfer plates 11b and thereafter exits from pipe joint portion 14 on the hot water exit side.

Each of the plurality of heat transfer plates 11b includes a recess 11b3 provided in an outer edge. Recess 11b3 is recessed inward from the outer edge of heat transfer plate 11b in a plan view. Recesses 11b3 in the plurality of heat transfer plates 11b are arranged as being superimposed on one another in the direction of layering of the plurality of heat transfer plates 11b. Four recesses 113 are provided in one heat transfer plate 11b. Two recesses 11b3 are provided in each of an upstream side and a downstream side of heat transfer plate 11b in the flow of the heating gas. Recess 11b3 is arranged on each of one side and the other side in a longitudinal direction of heat transfer plate 11b in each of the upstream and downstream sides of heat transfer plate 11b.

Case 12 accommodates a plurality of heat transfer plates 11b of heat exchange portion 11. Front plate portion 11a of heat exchange portion 11 forms a part of case 12. Case 12 includes an inlet FI through which a heating gas flows in, an outlet FO through which a heating gas flows out, and a peripheral wall portion 120 connecting inlet FI and outlet FO to each other. Case 12 forms a frame which opens upward and downward. A heating gas flows into latent heat recovery heat exchanger 10 through inlet FI which is an upper opening and the heating gas flows out of latent heat recovery heat exchanger 10 through outlet FO which is a lower opening. Peripheral wall portion 120 of case 12 surrounds the plurality of heat transfer plates 11b. Each of the plurality of heat transfer plates 11b extends in a direction from inlet FI to outlet FO.

Peripheral wall portion 120 of case 12 has front plate portion 11a, a rear wall portion 12a, and a pair of sidewall portions 12b. Rear wall portion 12a is arranged to sandwich a plurality of heat transfer plates 11b between rear wall portion 12a and front plate portion 11a. Rear wall portion 12a is arranged opposite to front plate portion 11a with the plurality of heat transfer plates 11b lying therebetween. The pair of sidewall portions 12b extends from opposing ends of rear wall portion 12a toward front plate portion 11a. The pair of sidewall portions 12b is joined to front plate portion 11a.

Figure 6:
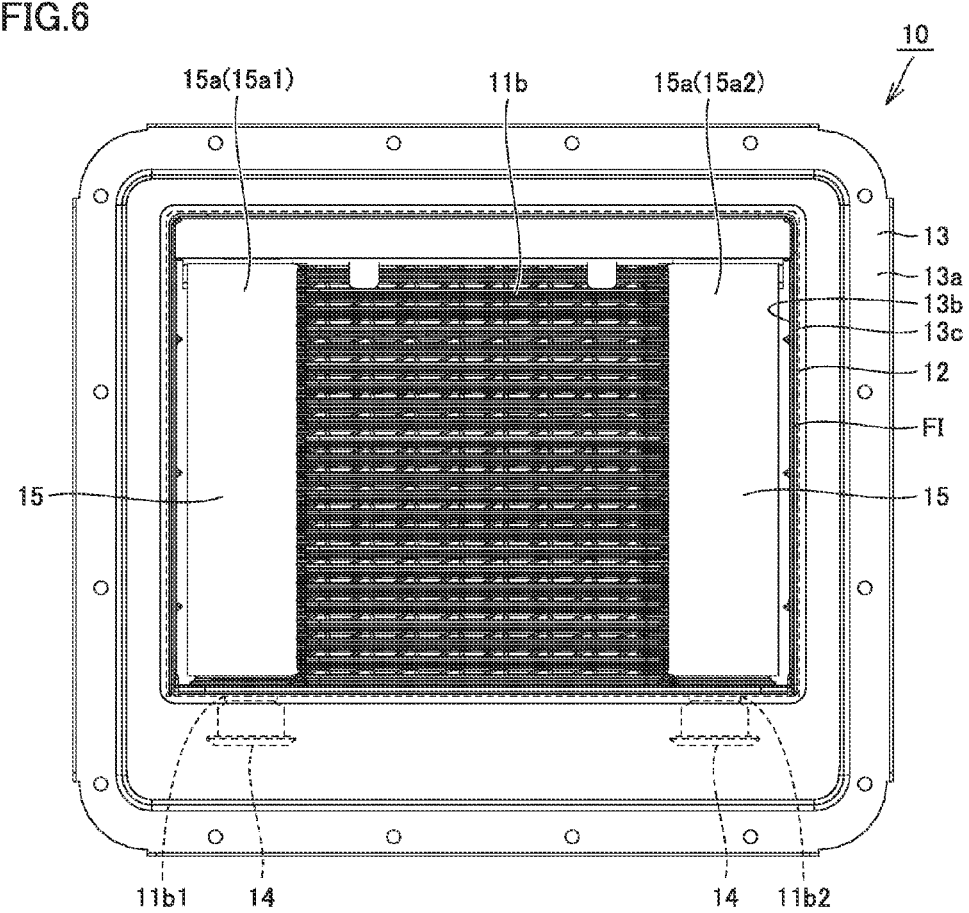
FIG. 6 is a plan view schematically showing the construction of the latent heat recovery heat exchanger in one embodiment of the present invention.

Referring to FIGS. 4 to 6, straightening vane 15 is arranged in case 12. Straightening vane 15 is configured to rectify the heating gas. Straightening vane 15 is surrounded by peripheral wall portion 120 of case 12. Straightening vane 15 includes a top plate portion 15a, a side plate portion 15b, and a bottom plate portion 15c. Straightening vane 15 may be formed by bending one plate.

Top plate portion 15a is arranged upstream from heat exchange portion 11 in a flow of the heating gas. Top plate portion 15a is arranged between inlet FI and heat exchange portion 11 from inlet FI toward outlet FO. Top plate portion 15a covers the plurality of heat transfer plates 11b so as to close a space between the plurality of heat transfer plates 11b in end portions 11ba of the plurality of heat transfer plates 11b in a direction intersecting with the direction of layering of the plurality of heat transfer plates 11b when heat exchange portion 11 is viewed from inlet FI toward outlet FO. Top plate portion 15*a* extends from front plate portion 11*a* to rear plate portion 11*c* along sidewall portion 12*b* of case 12.

Top plate portion 15*a* extends from end portions 11*ba* of the plurality of heat transfer plates 11*b* to the inner side relative to at least any of inflow portion 11*b*1 and outflow portion 11*b*2 in the direction intersecting with the direction of layering of the plurality of heat transfer plates 11*b* when heat exchange portion 11 is viewed from inlet FI toward outlet FO. In the present embodiment, in that direction, top plate portion 15*a* extends from end portions 11*ba* on one side of the plurality of heat transfer plates 11*b* to the inner side relative to inflow portion 11*b*1 and extends from end portions 11*ba* on the other side of the plurality of heat transfer plates 11*b* to the inner side relative to outflow portion 11*b*2.

Top plate portion 15*a* includes a first top plate portion 15*a*1 and a second top plate portion 15*a*2 separate from first top plate portion 15*a*1. First top plate portion 15*a*1 extends from end portions 11*ba* (one end portions) of the plurality of heat transfer plates 11*b* to the inner side relative to inflow portion 11*b*1 in the direction intersecting with the direction of layering of the plurality of heat transfer plates 11*b* when heat exchange portion 11 is viewed from inlet FI toward outlet FO. The second top plate portion extends from end portions 11*ba* (the other end portions) of the plurality of heat transfer plates 11*b* to the inner side relative to outflow portion 11*b*2 in the direction intersecting with the direction of layering of the plurality of heat transfer plates 11*b* when heat exchange portion 11 is viewed from inlet FI toward outlet FO.

Side plate portion 15*b* is connected to top plate portion 15*a*. Side plate portion 15*b* extends in the direction from inlet FI toward outlet FO. Side plate portion 15*b* is arranged downstream from top plate portion 15*a* in the flow of the heating gas. Side plate portion 15*b* is arranged between sidewall portion 12*b* of case 12 and the plurality of heat transfer plates 11*b*. Side plate portion 15*b* covers the plurality of heat transfer plates 11*b* so as to close the space between the plurality of heat transfer plates 11*b* in the direction intersecting with the direction of layering of the plurality of heat transfer plates 11*b* when heat exchange portion 11 is viewed from inlet FI toward outlet FO. Side plate portion 15*b* extends from front plate portion 11*a* to rear plate portion 11*c* along sidewall portion 12*b* of case 12.

Side plate portion 15*b* is fixed to each of the plurality of heat transfer plates 11*b*. Specifically, each of the plurality of heat transfer plates 11*b* is fixed to an inner surface of side plate portion 15*b*. Each of the plurality of heat transfer plates 11*b* is brazed to the inner surface of side plate portion 15*b*.

Bottom plate portion 15*c* is connected to side plate portion 15*b*. Bottom plate portion 15*c* is arranged downstream from side plate portion 15*b* in the flow of the heating gas. Bottom plate portion 15*c* is arranged downstream from heat exchange portion 11 in the flow of the heating gas. Bottom plate portion 15*c* is arranged between outlet FO and heat exchange portion 11 from inlet FI toward outlet FO.

Bottom plate portion 15*c* covers the plurality of heat transfer plates 11*b* so as to close a space between the plurality of heat transfer plates 11*b* in end portions 11*ba* of the plurality of heat transfer plates 11*b* in the direction intersecting with the direction of layering of the plurality of heat transfer plates 11*b* when heat exchange portion 11 is viewed from outlet FO toward inlet FI. Bottom plate portion 15*c* extends from front plate portion 11*a* toward rear plate portion 11*c* along sidewall portion 12*b* of case 12.

Straightening vane 15 has an end on a side of heat exchange portion 11 locked to recess 11*b*3. Specifically, an end of top plate portion 15*a* opposite to side plate portion 15*b* is fitted into recess 11*b*3 and an end of bottom plate portion 15*c* opposite to side plate portion 15*b* is fitted into recess 11*b*3.

Straightening member 16 is arranged between rear plate portion 11*c* of heat exchange portion 11 and rear wall portion 12*a* of case 12.

Figure 7:
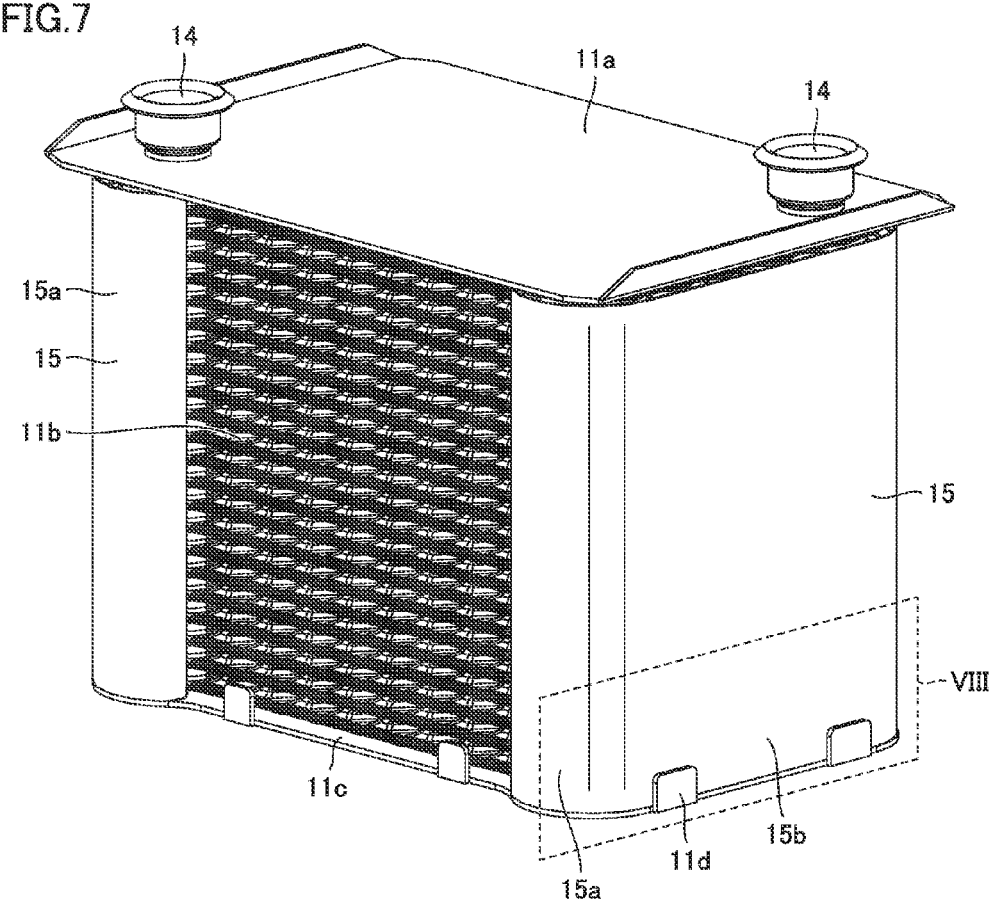
FIG. 7 is a perspective view schematically showing the construction of the heat exchange portion of the latent heat recovery heat exchanger in one embodiment of the present invention.
Figure 8:
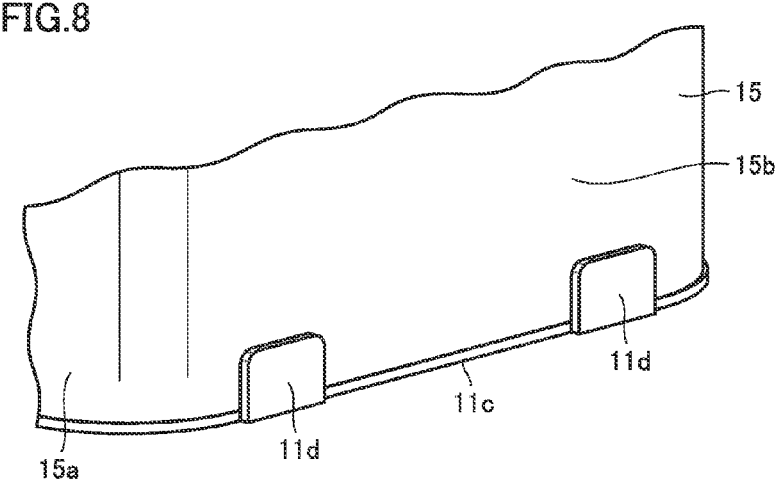
FIG. 8 is an enlarged view showing a VIII portion in FIG. 7.

Referring to FIGS. 4, 7, and 8, rear plate portion 11*c* sandwiches the plurality of heat transfer plates 11*b* between rear plate portion 11*c* and peripheral wall portion 120 of case 12 in the direction of layering of the plurality of heat transfer plates 11*b*. Specifically, rear plate portion 11*c* sandwiches the plurality of heat transfer plates 11*b* between rear plate portion 11*c* and front plate portion 11*a*. Side plate portion 15*b* lies between the plurality of heat transfer plates 11*b* and protrusion portion 11*d*. Two protrusion portions 11*d* are provided for one straightening vane 15. Two protrusion portions 11*d* are arranged at each of upstream and downstream locations in the flow of the heating gas.

Figure 9:
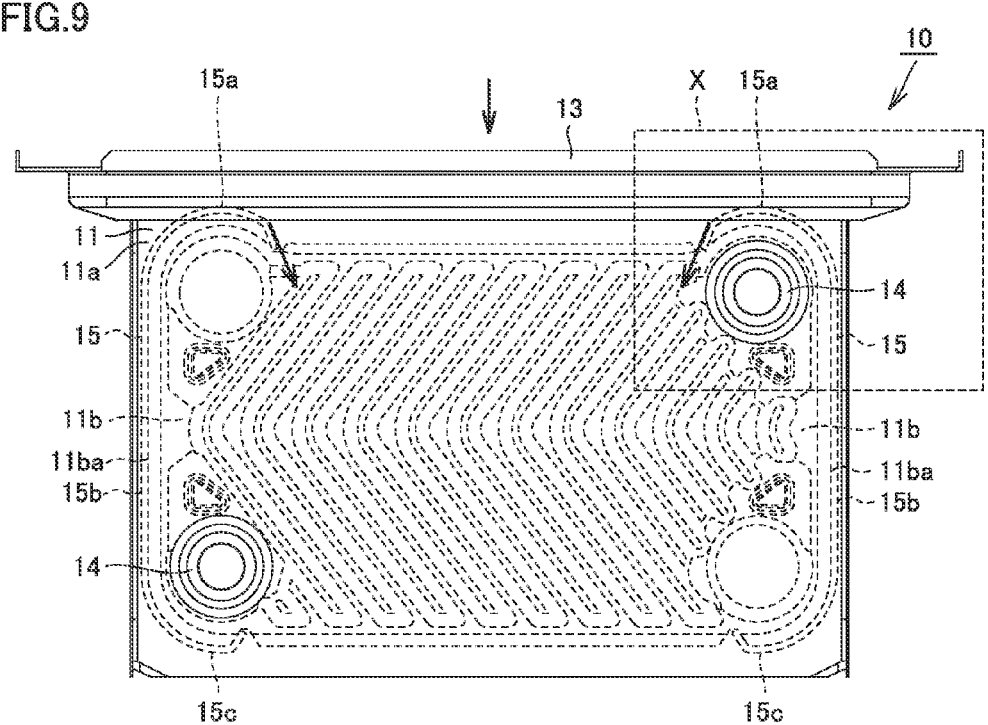
FIG. 9 is a front view showing a flow of a heating gas in the latent heat recovery heat exchanger in one embodiment of the present invention.

Referring to FIGS. 4 and 9, top plate portion 15*a* is inclined to have a down grade inward from end portions 11*ba* of the plurality of heat transfer plates 11*b*. Top plate portion 15*a* is curved to protrude toward inlet FI. Top plate portion 15*a* is curved to protrude upward.

Referring to FIGS. 3 and 4, flange member 13 is arranged in an upper end portion 12*c* of case 12. Flange member 13 is in a surrounding shape. Flange member 13 includes an extension portion 13*a*, an opening 13*b*, and a rising coupling portion 13*c*. Extension portion 13*a* extends from upper end portion 12*c* of case 12 to the outside of case 12. Opening 13*b* is provided on an inner side of extension portion 13*a*. Opening 13*b* is quadrangular when flange member 13 is viewed from above. Extension portion 13*a* is provided to surround opening 13*b*.

Extension portion 13*a* includes a first stepped portion and a second stepped portion arranged on an outer side of the first stepped portion. The first stepped portion is arranged on a side of opening 13*b*. The second stepped portion is arranged opposite to opening 13*b* with respect to the first stepped portion. The second stepped portion is arranged above the first stepped portion. Sealing member 60 is placed on the second stepped portion. Rising coupling portion 13*c* is constructed to rise upward from extension portion 13*a* along opening 13*b*. Upper end portion 12*c* of case 12 is inserted in opening 13*b*. Rising coupling portion 13*c* is joined from the outer side to upper end portion 12*c* of case 12 inserted in opening 13*b*. Specifically, rising coupling portion 13*c* is welded to upper end portion 12*c* of case 12.

Figure 2:
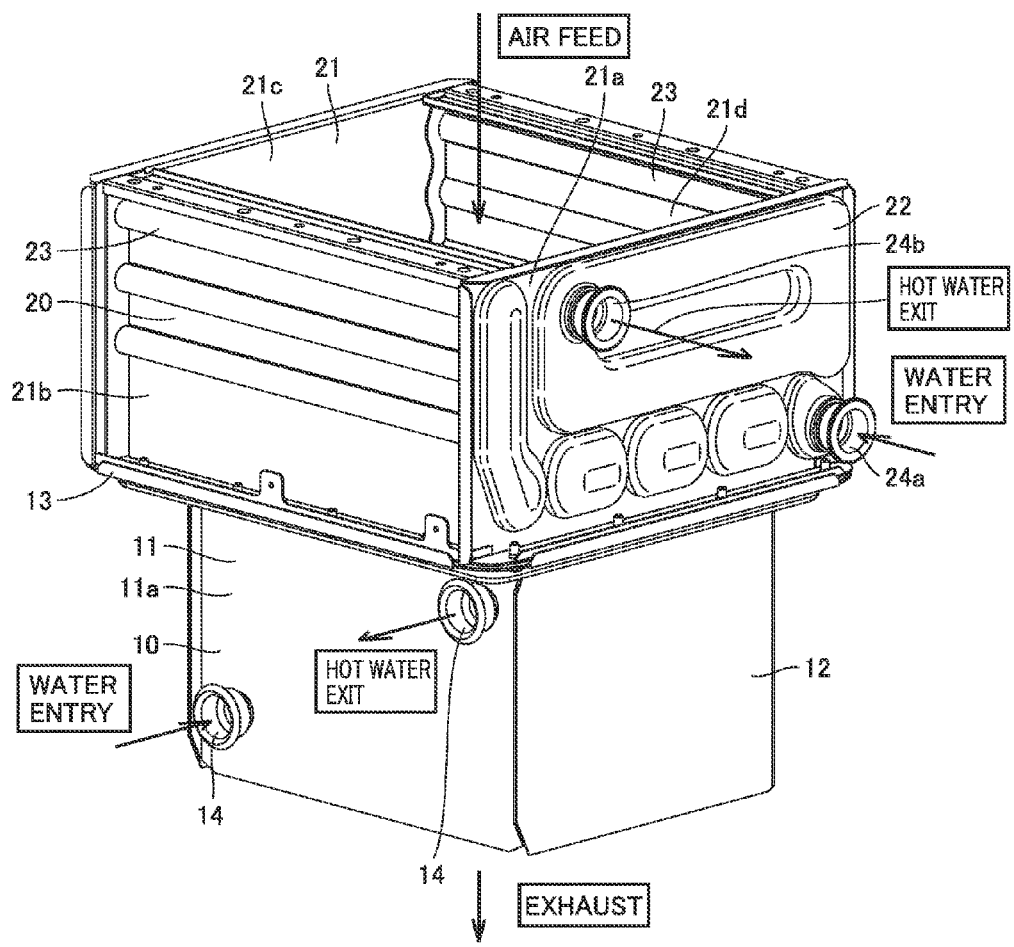
FIG. 2 is a perspective view schematically showing a construction of a sensible heat recovery heat exchanger and a latent heat recovery heat exchanger in one embodiment of the present invention.

Referring to FIGS. 2 and 9, the heating gas which has passed through sensible heat recovery heat exchanger 20 flows into case 12 of latent heat recovery heat exchanger 10 from inlet FI of case 12 of latent heat recovery heat exchanger 10.

Figure 10:
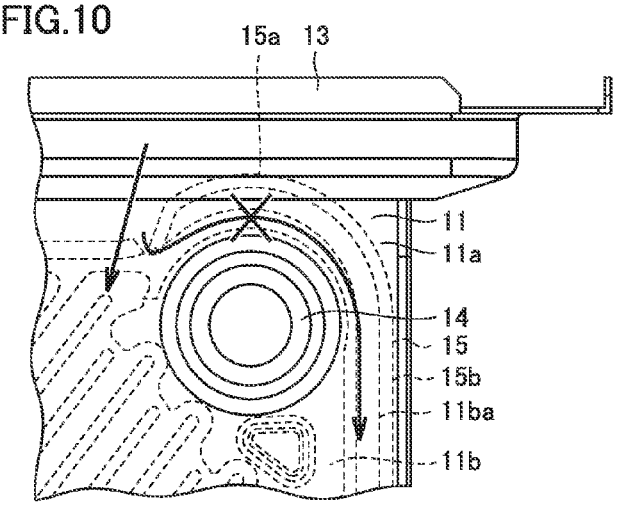
FIG. 10 is an enlarged view showing an X portion in FIG. 9.

Referring to FIGS. 9 and 10, the heating gas which has flowed into latent heat recovery heat exchanger 10 flows between the plurality of heat transfer plates 11*b* of heat exchange portion 11 from inlet FI toward outlet FO. Flow path projections and recesses are formed in the center of the plurality of heat transfer plates 11*b*. The heating gas which passes the flow path projections and recesses contributes to heat exchange. Since flow path projections and recesses are not formed in end portions 11*ba* (outer peripheral portion) of the plurality of heat transfer plates, the heating gas which passes end portions 11*ba* of the plurality of heat transfer plates 11*b* does not contribute to heat exchange.

The heating gas which flows through inlet FI from above straightening vane 15 flows over an upper surface of top plate portion 15a and flows to the center of the plurality of heat transfer plates 11b. Therefore, flow of the heating gas to end portions 11ba of the plurality of heat transfer plates 11b is suppressed. Shortcut of the heating gas to end portions 11ba of the plurality of heat transfer plates 11b is thus suppressed.

Functions and effects of the present embodiment will now be described in comparison with a comparative example.

Figure 11:
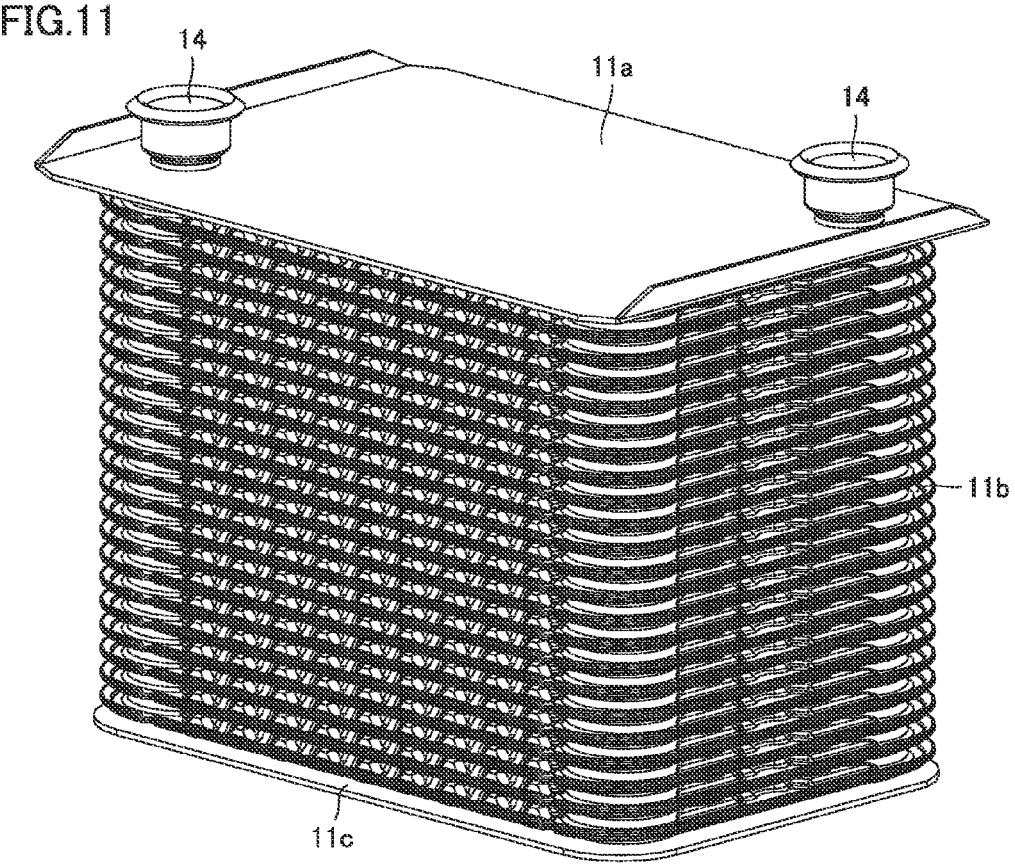
FIG. 11 is a perspective view schematically showing a construction of the heat exchange portion in the latent heat recovery heat exchanger in a comparative example.
Figure 12:
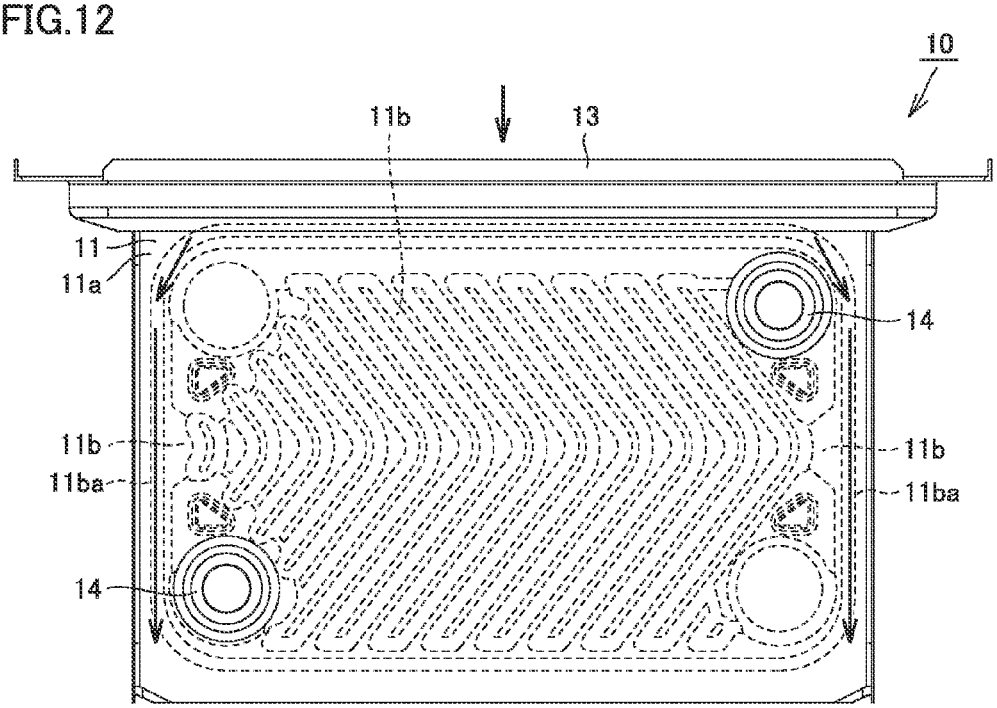
FIG. 12 is a front view showing a flow of the heating gas in the latent heat recovery heat exchanger in the comparative example.

Latent heat recovery heat exchanger 10 in a comparative example will be described with reference to FIGS. 11 and 12. Latent heat recovery heat exchanger 10 in the comparative example does not include straightening vane 15 in the present embodiment. Therefore, the heating gas which flows through inlet FI from above straightening vane 15 flows to end portions 11ba of the plurality of heat transfer plates 11b. Therefore, shortcut of the heating gas to end portions 11ba of the plurality of heat transfer plates 11b occurs.

In contrast, according to latent heat recovery heat exchanger 10 in the present embodiment, as shown in FIGS. 4 and 9, top plate portion 15a of straightening vane 15 covers heat transfer plates 11b so as to close the space between the plurality of heat transfer plates 11b in end portions 11ba of the plurality of heat transfer plates 11b. Therefore, flow of the heating gas in end portions 11ba of the plurality of heat transfer plates 11b which does not contribute to heat exchange can be suppressed. Thermal efficiency of latent heat recovery heat exchanger 10 can thus be improved.

According to latent heat recovery heat exchanger 10 in the present embodiment, as shown in FIGS. 4 and 6, top plate portion 15a extends from end portions 11ba of the plurality of heat transfer plates 11b to the inner side relative to inflow portion 11b1 and outflow portion 11b2 in the direction intersecting with the direction of layering of the plurality of heat transfer plates 11b when heat exchange portion 11 is viewed from inlet FI toward the outlet. Therefore, top plate portion 15a can cover the plurality of heat transfer plates 11b from end portions 11ba of the plurality of heat transfer plates 11b to the inner side relative to inflow portion 11b1 and outflow portion 11b2. Therefore, flow of the heating gas in end portions 11ba of the plurality of heat transfer plates 11b which does not contribute to heat exchange can be suppressed. Thermal efficiency of latent heat recovery heat exchanger 10 can thus be improved.

According to latent heat recovery heat exchanger 10 in the present embodiment, as shown in FIGS. 4 and 6, top plate portion 15a includes first top plate portion 15a1 and second top plate portion 15a2 separate from first top plate portion 15a1. Therefore, first top plate portion 15a1 can cover the plurality of heat transfer plates 11b from end portions 11ba of the plurality of heat transfer plates 11b to the inner side relative to inflow portion 11b1 and second top plate portion 15a2 can cover the plurality of heat transfer plates 11b from end portions 11ba of the plurality of heat transfer plates 11b to the inner side relative to outflow portion 11b2. Therefore, flow of the heating gas in end portions 11ba of the plurality of heat transfer plates 11b which does not contribute to heat exchange can be suppressed. Thermal efficiency of latent heat recovery heat exchanger 10 can thus be improved.

According to latent heat recovery heat exchanger 10 in the present embodiment, as shown in FIGS. 4 and 5, side plate portion 15b covers the plurality of heat transfer plates 11b so as to close the space between the plurality of heat transfer plates 11b in the direction intersecting with the direction of layering of the plurality of heat transfer plates 11b when heat exchange portion 11 is viewed from inlet FI toward the outlet. Therefore, flow of the heating gas from the space between the plurality of heat transfer plates 11b toward case 12 can be suppressed. Increase in temperature of case 12 can thus be suppressed.

According to latent heat recovery heat exchanger 10 in the present embodiment, as shown in FIGS. 4 and 5, side plate portion 15b is fixed to each of the plurality of heat transfer plates 11b. Therefore, side plate portion 15b can reinforce the plurality of heat transfer plates 11b.

According to latent heat recovery heat exchanger 10 in the present embodiment, as shown in FIGS. 4 and 9, bottom plate portion 15c covers the plurality of heat transfer plates 11b so as to close the space between the plurality of heat transfer plates 11b in end portions 11ba of the plurality of heat transfer plates 11b in the direction intersecting with the direction of layering of the plurality of heat transfer plates 11b when heat exchange portion 11 is viewed from outlet FO toward inlet FI. Therefore, the heating gas can flow to the inside of latent heat recovery heat exchanger 10 along bottom plate portion 15c. Increase in temperature of case 12 can thus be suppressed.

According to latent heat recovery heat exchanger 10 in the present embodiment, as shown in FIGS. 7 and 8, side plate portion 15b lies between the plurality of heat transfer plates 11b and protrusion portion 11d. Therefore, side plate portion 15b can be held as lying between the plurality of heat transfer plates 11b and protrusion portion 11d. Side plate portion 15b is thus more readily held.

According to latent heat recovery heat exchanger 10 in the present embodiment, as shown in FIG. 5, straightening vane 15 has an end on the side of heat exchange portion 11 locked to recess 11b3. Therefore, straightening vane 15 can be fixed to the plurality of heat transfer plates 11b.

According to latent heat recovery heat exchanger 10 in the present embodiment, as shown in FIGS. 2 and 9, top plate portion 15a is inclined to have a down grade inward from end portions 11ba of the plurality of heat transfer plates 11b. Therefore, top plate portion 15a can allow the heating gas to flow to the inside of latent heat recovery heat exchanger 10. Thus, flow of the heating gas in end portions 11ba of the plurality of heat transfer plates 11b which does not contribute to heat exchange can be suppressed. Thermal efficiency of latent heat recovery heat exchanger 10 can thus be improved.

Hot water apparatus 100 in the present embodiment includes latent heat recovery heat exchanger 10 and combustion apparatus (burner) 30 for generating the heating gas. Therefore, hot water apparatus 100 including the latent heat recovery heat exchanger capable of achieving improved thermal efficiency can be provided.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A heat exchanger for exchanging heat between a heating gas which flows outside and water and/or hot water which flows inside, the heat exchanger comprising:
   a case including an inlet through which the heating gas flows in, an outlet that faces the inlet and through which the heating gas flows out, and a peripheral wall portion which connects the inlet and the outlet to each other;

a heat exchange portion including a plurality of heat transfer plates surrounded by the peripheral wall portion of the case and layered on one another, each of the plurality of heat transfer plates extending in a direction from the inlet toward the outlet; and a straightening vane surrounded by the peripheral wall portion of the case and rectifying the heating gas, wherein the straightening vane includes a top plate portion which covers the plurality of heat transfer plates so as to close a space between the plurality of heat transfer plates in end portions of the plurality of heat transfer plates in a direction intersecting with a direction of layering of the plurality of heat transfer plates when the heat exchange portion is viewed from the inlet toward the outlet, an outermost heat transfer plate of the plurality of heat transfer plates includes at least any of an inflow portion through which the water and/or hot water flows in and an outflow portion through which the water and/or hot water flows out, the top plate portion extends from the end portions of the plurality of heat transfer plates to an inner side relative to at least any of the inflow portion and the outflow portion in the direction intersecting with the direction of layering of the plurality of heat transfer plates when the heat exchange portion is viewed from the inlet toward the outlet, the top plate portion includes a first top plate portion and a second top plate portion separate from the first top plate portion, the first top plate portion extends from the end portions of the plurality of heat transfer plates to the inner side relative to the inflow portion in the direction intersecting with the direction of layering of the plurality of heat transfer plates when the heat exchange portion is viewed from the inlet toward the outlet, and the second top plate portion extends from the end portions of the plurality of heat transfer plates to the inner side relative to the outflow portion in the direction intersecting with the direction of layering of the plurality of heat transfer plates when the heat exchange portion is viewed from the inlet toward the outlet.

2. The heat exchanger according to claim 1, wherein the straightening vane includes a side plate portion which is connected to the top plate portion and extends in the direction from the inlet toward the outlet, and the side plate portion covers the plurality of heat transfer plates so as to close a space between the plurality of heat transfer plates in the direction intersecting with the direction of layering of the plurality of heat transfer plates when the heat exchange portion is viewed from the inlet toward the outlet.

3. The heat exchanger according to claim 2, wherein the side plate portion is fixed to each of the plurality of heat transfer plates.

4. The heat exchanger according to claim 2, wherein the straightening vane includes a bottom plate portion connected to the side plate portion, and the bottom plate portion covers the plurality of heat transfer plates so as to close a space between the plurality of heat transfer plates in the end portions of the plurality of heat transfer plates in the direction intersecting with the direction of layering of the plurality of heat transfer plates when the heat exchange portion is viewed from the outlet toward the inlet.

5. The heat exchanger according to claim 2, wherein the heat exchange portion includes a rear plate portion sandwiching the plurality of heat transfer plates between the rear plate portion and the peripheral wall portion in the direction of layering of the plurality of heat transfer plates, and a protrusion portion protruding from the rear plate portion in the direction of layering of the plurality of heat transfer plates, and the side plate portion lies between the plurality of heat transfer plates and the protrusion portion.

6. The heat exchanger according to claim 1, wherein each of the plurality of heat transfer plates includes a recess provided in an outer edge, and the straightening vane has an end on a side of the heat exchange portion locked to the recess.

7. The heat exchanger according to claim 1, wherein the top plate portion is inclined to have a down grade inward from the end portions of the plurality of heat transfer plates.

8. A hot water apparatus comprising:

the heat exchanger according to claim 1; and a burner for generating the heating gas.

9. The heat exchanger according to claim 1, wherein the inlet and the outlet are arranged directly opposing one another across the case.

10. The heat exchanger according to claim 1, wherein the inlet is an upper opening in the case and the outlet is a lower opening in the case.

* * * * *